United States Patent [19]
Strong, III

[11] Patent Number: 5,604,669
[45] Date of Patent: Feb. 18, 1997

[54] RESONANT, CURRENT MODE REGULATED, HALF-BRIDGE POWER SUPPLY

[75] Inventor: Maurice L. Strong, III, Wheeling, Ill.

[73] Assignee: Northrop Grumman Corporation, Los Angeles, Calif.

[21] Appl. No.: 413,030

[22] Filed: Mar. 28, 1995

[51] Int. Cl.$^6$ .................................................. H02M 3/335
[52] U.S. Cl. .................................. 363/17; 363/26; 363/97
[58] Field of Search ............................ 363/17, 26, 69, 363/70, 74, 75, 97, 132

[56] References Cited

U.S. PATENT DOCUMENTS

| | | | |
|---|---|---|---|
| 4,150,424 | 4/1979 | Nuechterlein | 363/26 |
| 4,858,094 | 8/1989 | Barlage | 363/26 |
| 5,036,452 | 7/1991 | Loftus | 363/71 |
| 5,343,382 | 8/1994 | Hale et al. | 363/17 |

*Primary Examiner*—Stuart N. Hecker
*Attorney, Agent, or Firm*—Terry J. Anderson; Karl J. Hoch, Jr.

[57] ABSTRACT

Paralleled DC power supplies each comprise a half-bridge, resonant inverter (19–23) feeding a converter (25–28) connected to a common load 8. Current mode control (50–54) is provided (36) through a PWM IC (30) to which the output voltage (31) is fed back. Inverter capacitor imbalance is corrected (52, 55–59). Load sharing (71) is accommodated with offset compensating bidirectional buffer amplifier circuits (65–70, 74–76).

5 Claims, 2 Drawing Sheets

RESONANT, CURRENT MODE REGULATED, HALF-BRIDGE POWER SUPPLY

TECHNICAL FIELD

This invention is a resonant, half-bridge power supply including a balanced, current mode inner control loop, and buffered voltage for current sharing control of paralleled supplies.

BACKGROUND ART

Low voltage, high current DC power requirements are generally accommodated by use of multiple power supplies connected in parallel to satisfy the total load current requirement. Originally, parallel supplies relied on droop in output voltage as a function of current to spread the load among the supplies. In such systems, the power supply with the highest gain would tend to operate at full current all the time, the supply with the next higher gain helping out when needed, and so forth. This results in one or two supplies running at maximum temperature and thereby aging more quickly. Furthermore, droop is at times intolerable.

To improve sharing of the load among parallel supplies, current mode regulation compares the output voltage error with a voltage indicative of current being supplied by a switching device to the load. A half-wave current mode regulator is illustrated in U.S. Pat. No. 5,122,726. However, this device is very inefficient and does not provide a quality DC voltage to the load. Additionally, the circuit of this patent bridges the voltage errors together through diodes, so that only the highest error is utilized to control all of the power supplies, thereby not regulating all but one of them in true current mode (not closed loop feedback in each of the other power supplies). In the '726 patent, a single error amplifier must drive the current mode pulse width modulator of all of the paralleled converters, which may easily exceed the capability of the circuits utilized.

An example of a load sharing, half-bridge (full wave) power converter is set forth in U.S. Pat. No. 5,164,890. This type of half-bridge is described in part with respect to FIG. 1. It is known to provide regulated voltage to a load 8 connected between a voltage bus 9 and ground 10, the bus 9 being connected to the output lines 11, 12 of a plurality of power supplies 13, 14 connected in parallel. One general form of power supply uses a half-bridge inverter in which a pair of metal-oxide-silicon field effect transistor (MOSFET) power switches 17, 18 are operated in alternating half cycles so as to provide current, first, from a positive side 19 of a voltage source, through switch 17, through a power transformer primary 20 and a capacitor 21 to a negative side 22 of the voltage source, and then from the positive side 19, through a capacitor 23, through the primary 20, in an opposite direction, and the switch 18 to the negative side 22. The power transformer associated with the primary winding 20 has a secondary winding 25 with a center tap to ground, each end of which is connected through a corresponding diode 26, 27 to a load filter capacitor 28 that is connected to the output 11. The switches are controlled in a voltage outer control loop by means of a commercially available pulse width modulated integrated circuit (PWM IC) 30, which typically may comprise the 3825 series, available from Unitrode and Silicon General, among others. In this type control, a voltage feedback signal is provided on a sense line 31 to an inverting input (−) of an error amplifier 32, the non-inverting input (+) of which is provided by a voltage reference 33 which defines the desired, regulated output voltage at the output 11. The output of the error amp 32 on a line 34 is provided to a negative input (−) of a compare circuit 35, the positive input (+) of which is connected to a line 36 which has essentially a ramp voltage thereon. As is known, when the ramp voltage exceeds the error voltage on the line 34, the output of the compare circuit on a line 37 resets a bistable device 38 thereby cutting off the remaining portion of the output of an oscillator 39 at a gate 40. The output of the gate 40 triggers a toggle (flip-flop) 41 that determines which of two gates 42, 43 will be enabled, in an alternating fashion. The outputs of the gates 42 and 43 on corresponding lines 44, 45 operate the switches 17, 18 as described hereinbefore. All of the apparatus 31–43 is known, and is typically part of the PWM IC 30.

In the '890 patent, the average current supplied to the output power transformer of each of a plurality of parallel-connected power converters is compared to the average current of them all, and used to modify the output voltage feedback which is compared with the reference in the manner described hereinbefore. However, this circuit switches trapezoidal waves, thereby inherently switching the current on and off at nearly full voltage and full current, which results in inefficient switching losses in the inverter switches. Furthermore, by taking into account the differences in output current among the supplies, and modifying the local voltage feedback in each converter locally, the feedback does not accommodate the internal variances among the various converters, in the sense of true current mode regulation.

For greatest efficiency, full wave resonant conversion should be employed. However, current mode control in full wave converters is subject to charge imbalance during the switching half-cycles causing imbalance in the inverter capacitors' charge/discharge voltages, which eventually cause the capacitor bridge node to drift to the full supply voltage, thereby reducing the half bridge to operation in a half wave mode, which is intolerable. The imbalance can be caused by variations in the turn on/turn off characteristics of the MOSFET switches, slight variations in the internal impedance of the MOSFET switches, variations in the inverter resonant capacitor (21, 23) values, and so forth.

DISCLOSURE OF INVENTION

Objects of the invention include provision of a highly efficient, half-bridge, resonant, current mode regulated DC-to-DC power converter which can be connected in parallel with a large number of similar converters so as to properly share extremely high current loads.

According to the present invention, any imbalance in the voltage developed as a function of output current in a half-bridge, resonant power converter, from one half cycle to the next, is subtracted from the current-feedback voltage supplied to the voltage error comparator, thereby causing a complimentary imbalance in switching time that rebalances the output current. According to the invention further, the current-feedback voltage is developed across a capacitor, thereby enabling use in a resonant half-bridge current mode regulated converter.

In accordance with the invention, the output of the error amplifier of a PWM IC is connected to a shared voltage feedback line by means of bidirectional buffer amplifier circuits. In accordance with the invention further, voltage offsets in the PWM IC error amplifier are accommodated in the bidirectional buffer amplifier circuits, thereby enabling paralleling of supplies having different offset voltages, and with scaling of no load to full load voltage referenced to zero error volts.

The invention permits the efficiencies of resonant, half-bridge operation which occurs with inverter switching of nearly zero current in each half cycle; the current sharing effectiveness of true current mode control; and paralleling of a large number of DC/DC power converters with efficient load sharing.

The invention has the inherent additional advantage of being capable of implementation utilizing a standard PWM IC in a true current mode regulator.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
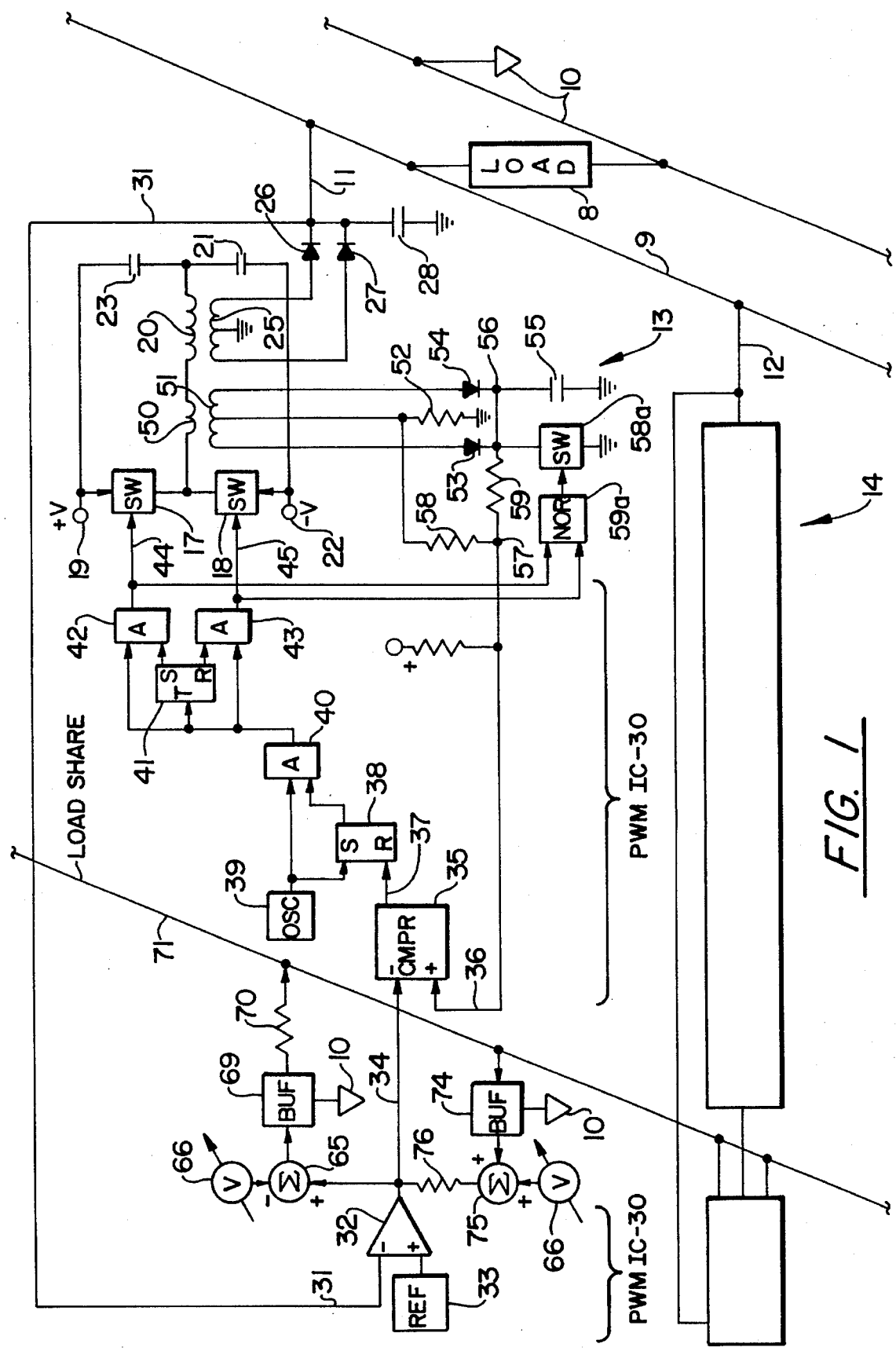
FIG. 1 is a schematic block diagram of one embodiment of the invention.

Referring to the drawing, to achieve true current mode control, the ramp voltage on the line 36 is provided in response to the flow of current in the primary 20 of the power transformer as described hereinbefore. A current sense primary winding 50 induces current in a secondary winding 51, the center tap of which is fed through a resistor 52 to ground. The respective ends of the secondary 51 are connected through diodes 53, 54 to a capacitor 55. The capacitor 55 integrates the sinusoidal current waveform from the secondary 51, in response first to current flowing in one direction through the primary 50, and alternately to current flowing in the opposite direction through the primary 50. A switch 58a across the capacitor 55 is operated by a NOR circuit 59a whenever both gates 42, 43 are off, thereby discharging the capacitor at the very end of each half-cycle. The voltage across the capacitor 55 is essentially a quarter sine wave with a period twice as great as the period of sinusoidal current in the inverter. It approximates a linear ramp voltage sufficiently to permit accurate current feedback modulation.

The inductance of the output transformer primary 20 and the capacitance of the coupling capacitors 21, 23 are selected to resonate at the switching frequency, according to the invention, in order to operate the half bridge in a resonant mode. Therefore, the current through the primaries 50, 20 is essentially sinusoidal.

Figure 2:
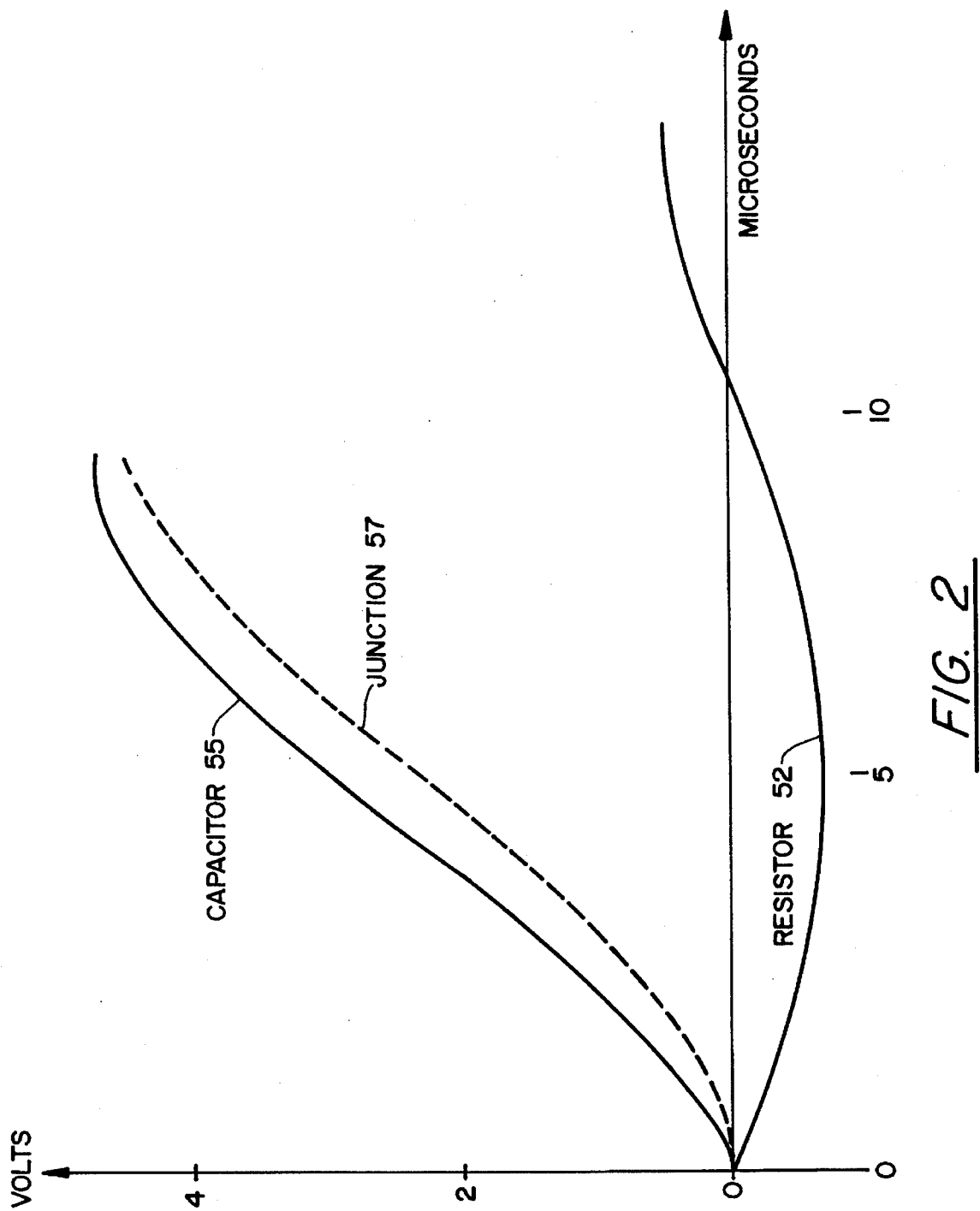
FIG. 2 is a waveform of current feedback in the embodiment of FIG. 1.

A correction signal, which drives any imbalance voltage across the inverter capacitors 21, 23 back into balance, is generated by the resistor 52. As the switched current in either half-cycle of switching increases due to a voltage imbalance across the inverter capacitors 21, 23, the current induced in the sensing transformer secondary 51 during that half-cycle increases proportionally, thereby causing an increase in the negative voltage developed across the resistor 52. This negative voltage is subtracted from the voltage provided by the capacitor 55 on a line 56 in a resistive summer 57–59, as illustrated by the waveform of FIG. 2. By summing in a larger negative voltage at the summing junction 56, the voltage on line 36 will be lowered during that half-cycle, causing the comparator to fire at a later time during that half-cycle. The effect of the negative voltage applied to the summing junction 57 is to stretch out the duty cycle and provide a longer current draw time so that the voltage across the coupling capacitor is decreased. This tends to drive the voltage on the capacitors to a balanced state. Thus, subtraction of the voltage on the resistor 52 from the current-indicating voltage across the capacitor 55 provides closed loop feedback as well as correction for imbalances between the two half-cycles. This effectively prevents runaway of voltage across either of the inverter coupling capacitors 21, 23.

Another aspect of the present invention is provision of a bilateral buffer amplifier at the output of the error amplifier 32. In the 3825 series of PWM IC, the error amplifier has a nominal 1.25 V offset which is accommodated at the ramp input of the compare circuit 35. However, the offset varies from one specific PWM IC to the next (from part to part). Therefore, to allow tracking of the amplifier outputs of a number of power supplies, the offset is corrected in each, before averaging. To achieve a shared error signal which has a range of error signal from zero volts to full scale as desired, the output of the error amplifier 32 is provided on a line 34 to the positive input of a summing junction 65, the negative input of which is an offset reference voltage 66, which preferably is variable, and is set to be equal to the voltage offset in the related error amplifier 32. The output of the summing junction 65 is scaled appropriately and applied to a buffer amplifier 69. This amplifier is connected through a resistor 70 to a common load sharing line 71, which is connected in a like manner to other power supplies, such as the power supply 14, which are paralleled with this power supply 13. The resistor 70 acts as a summing buffer resistor which permits, essentially, an average error voltage to be developed on the load sharing line 71 by all of the power supplies connected thereto.

The other part of the bidirectional amplifier includes a buffer amplifier 74 connected to the load sharing line 71, the output of which is fed to a summing junction 75, the other input of which is the offset reference voltage 66, which puts back the voltage taken out at the summing junction 65. The output of the summing junction 75 is averaged with the output of the error amplifier 32 by a buffer resistor 76 which is connected to the line 34. Thus if the output of this power supply is more divergent from the reference 33 than are other power supplies from their references 33, the voltage added back from the load share line 71 through the buffer resistor 76 will reduce that divergence, thereby causing the voltage output of this power supply to be more in line with that of the others. However, with respect to each power supply, closed loop current mode regulation is provided.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A current mode controlled, resonant regulated DC power supply, comprising:

a half-bridge resonant inverter including a power output transformer having a primary winding and a secondary winding;

a DC converter driven by said secondary winding, for connection to a load;

a pulse width modulator having a comparator responsive to an error amplifier connected to a reference voltage and to the output of said converter, and connected to control said inverter in a manner to regulate the voltage of said output in response thereto; and means responsive to the current in said primary winding for providing to the other input of said compare circuit a ramp voltage dependent on the current in said primary winding which increases the modulation pulse width of said modulator in response to a current imbalance in said inverter.

2. An inverter according to claim 1 wherein said ramp voltage is provided as the difference between an integral function of said current and a proportional function of said current.

3. An inverter according to claim 1 wherein:

said means generates a minuend voltage proportional to the integral of the current in said primary winding and a subtrahend voltage proportional to the current in said primary winding, and provides said ramp voltage as the difference between said minuend voltage and said subtrahend voltage.

4. A power supply system for driving a single load, comprising:

a load share line; and a plurality of DC power supplies, each power supply having a DC voltage output connected to said load, each power supply including a switched inverter and a pulse width modulator having an error amplifier responsive to said voltage output to operate said switched inverter in a manner to regulate the voltage output of the corresponding power supply;

characterized by the improvement comprising:

each power supply having a first buffer amplifier circuit responsive to the output of the corresponding error amplifier for providing a corresponding voltage to said load share line; and each power supply having a second buffer amplifier circuit responsive to the voltage on said load share line for providing a related voltage to the output of said corresponding error amplifier.

5. A system according to claim 4 wherein:

said first buffer amplifier circuit includes a subtractor for subtracting an offset voltage of said corresponding error amplifier from the output of said corresponding error amplifier, and each of said second buffer amplifier circuits includes an adder for adding back said offset voltage to the voltage on the load share line.

* * * * *